July 27, 1937.   H. H. HONIGBAUM   2,087,911
SHINGLE
Filed Jan. 17, 1935   4 Sheets-Sheet 1

INVENTOR.
Harry H. Honigbaum
BY
Cornelius Zabriskie
ATTORNEY.

July 27, 1937.   H. H. HONIGBAUM   2,087,911
SHINGLE
Filed Jan. 17, 1935    4 Sheets-Sheet 2

INVENTOR.
BY Harry H. Honigbaum
ATTORNEY.

July 27, 1937.　　　H. H. HONIGBAUM　　　2,087,911
SHINGLE
Filed Jan. 17, 1935　　　4 Sheets-Sheet 3

INVENTOR.
Harry H. Honigbaum
BY
ATTORNEY.

July 27, 1937.  H. H. HONIGBAUM  2,087,911
SHINGLE
Filed Jan. 17, 1935   4 Sheets-Sheet 4

INVENTOR:
Harry H. Honigbaum

Patented July 27, 1937

2,087,911

UNITED STATES PATENT OFFICE 2,087,911

SHINGLE

Harry H. Honigbaum, Forest Hills, N. Y.

Application January 17, 1935, Serial No. 2,169

7 Claims. (Cl. 108—7)

This invention relates to shingles and while adapted for shingles made of any material is particularly useful when incorporated in shingles of composition roofing. Shingles of this character, when laid on a roof, have a tendency to curl after a time or to flap in the wind and it is desirable therefore with such shingles to anchor or hold down the weather ends or edges in such a way as to keep them flat on a roof. The present invention provides novel and efficient means to this end.

I am of course aware that various expedients have been heretofore resorted to to hold down the weather ends of shingles, the most common expedient being to form on the body of the shingle and near the weather end thereof wings which extend beyond the body of the shingles in a lateral direction and are adapted to project beneath shingles of an underlying course to serve in connection therewith as an anchoring means for the shingles of the course in which they are embodied. Shingles with laterally extending wings serve the purpose satisfactorily from a mechanical standpoint, but the difficulty therewith from a manufacturing standpoint is that they involve, in their formation, generally a waste of material from which the shingles are formed or require particular manufacturing methods which are not open to public use.

The object of this invention therefore is to provide a shingle, composition or otherwise, so formed that it will embody wings adapted to extend under adjacent shingles of an underlying course, but with the wings formed actually within the body of the shingle by cuts extending inwardly of the body of the shingle from the weather end thereof. As a result, the wings extend in opposite directions from one another actually within the body of the shingle being formed by cuts extending into the body of the shingle from the weather end of the shingle. Shingles according to this construction can be made without any waste of material whatsoever. They may be as easily laid as shingles heretofore made and by varying the cuts which form the wings very odd and beautiful designs may be worked out for a finished roof.

The present invention provides not only for a novel wing arrangement as specified, but also provides for a formation of the body of the shingle in such a way that wings of the shingles of one course may enter into notches or cut outs in the shingles of a subjacent course as will be hereinafter fully explained and also embodies the formation of means for definitely spacing from the weather ends of the shingles the nails by which such shingles are held in place. The last mentioned means consists in cut outs or perforations in the body of the shingle to show definite location of the nails to be driven through the shingles when the shingles are applied to a roof. By placing the nails in accordance with the cut outs or perforations stated, they will be properly covered by the shingles of the next course and at the same time will serve to properly anchor the shingles in position.

Features of the invention, other than those adverted to will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1:
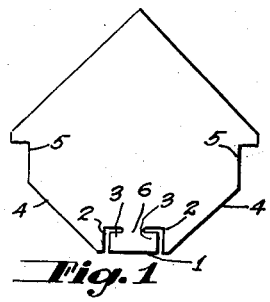
Figures 1–17 show different modified forms of shingle embodying the present invention.

Referring first to Figure 1 of the drawings, it will be noted that I have there shown a shingle of the well known diamond type, but with the weather point cut off to provide a straight weather edge I. In from this weather edge are formed two L-shaped cut outs 2 which extend first in substantially perpendicular relation to the edge I and then turned right angularly toward one another. By thus forming cut outs in the body of a shingle and within the confines of the contour of such body, there are formed two oppositely extending wings 3 contained wholly within the confines of the body of the shingle, above the weather edge I and between the lateral diverging edges 4 of the body. The lateral edges of the body are notched as shown at 5, although this is not essential to the functioning of this invention.

Figure 18:
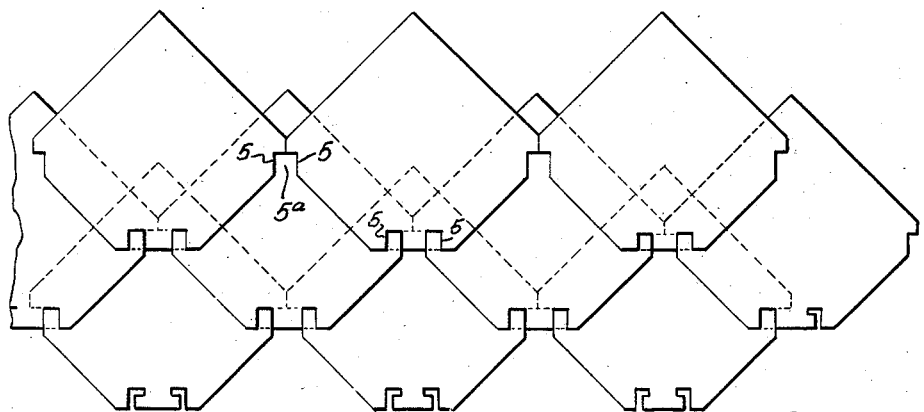
Figures 18 and 19 show different forms of shingle embodying the present invention in assembled relation as on a roof.

Shingles as shown in Figure 1 are laid as illustrated in Figure 18, so that the notches 5 of adjacent shingles of the same course are juxtaposed with respect to one another to provide a re-entrant opening 5a which is formed by each two adjacent notches 5 collectively and through this re-entrant opening passes the shank 6 by which the wing portions of the body of the shingle are united to the remainder of the shingle body. The notches 5 are preferably made of a depth, so that they will collectively form an opening 5a about equal to the width of the shank 6, so that the overlying shingles will be centralized with respect to the underlying shingles while the wings of the overlying shingles will project beneath the bodies of the two adjacent underlying shingles, as clearly appears in Figure 18. A very firm lock with accurate spacing is thus obtained and the weather ends of the several shingles will be permanently locked down against warping or flapping. It will also be noted from Figure 18 that the shingles made as specified produce a very fine appearance when assembled as described and while this appearance is rather unusual, it breaks up the sameness of a conventional roof and at the same time furnishes a thoroughly satisfactory roof covering which will not leak.

Figure 2:
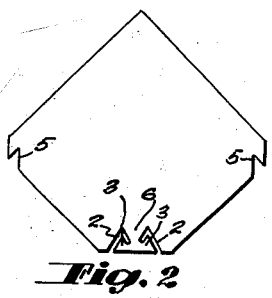
Figure 3:
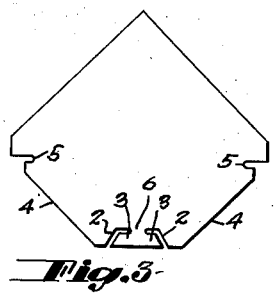
Figure 4:
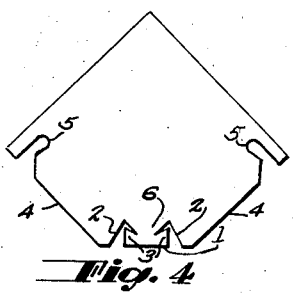

In the structure of Figure 2, the arrangement is very similar to Figure 1, although the slots 2 are cut at different angles, but nevertheless provide the wings 3 within the body as in the preceding figures, although of a different shape.

In like manner, the cut outs or slots extending inwardly from the weather end of the shingle to form the wings may be of a wide variety of shapes to produce wings 3 of widely varying configuration as exhibited in Figures 3–10 of the drawings, all of which figures apply to shingles of the diamond type. Similarly the notches 5 may be made in a wide variety of shapes, some of which will produce a better lock than others, as will be apparent to those skilled in the art. The notches 5 may, however, be omitted as is the case in Figures 5–10, although notches of appropriate shape may be used in the shingles of these figures.

In every case, however, the cut outs or slots extend inwardly from the weather edge of the shingle and form appropriate locking wings 3 which extend in opposite directions and form an actual inherent part of the body of the shingle itself and are contained within the confines of the body.

Inasmuch as the drawings show the shingle structure clearly, it is not considered necessary to describe each structure individually as the particular structures will be clearly understood by those skilled in the art from the foregoing description.

Figure 5:
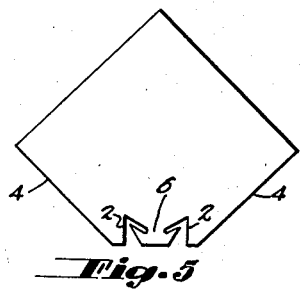
Figure 6:
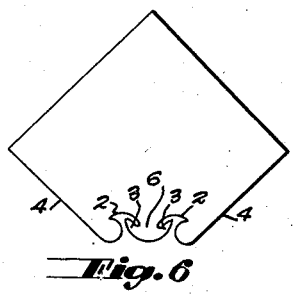
Figure 7:
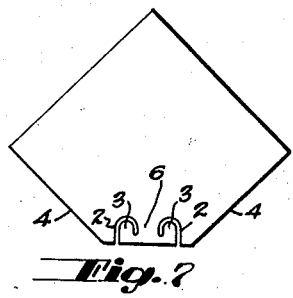
Figure 8:
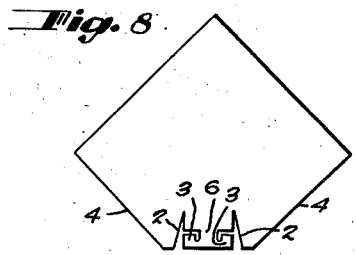
Figure 9:
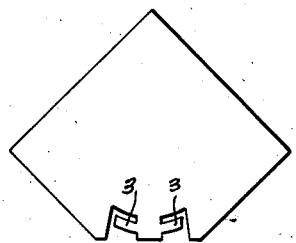
Figure 10:
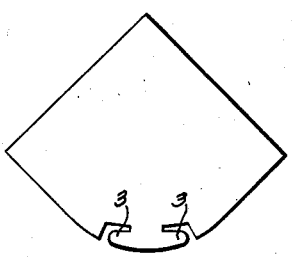
Figure 11:
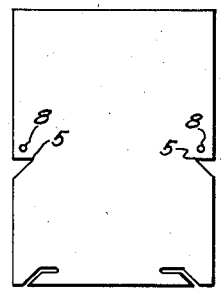
Figure 12:
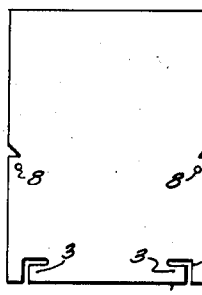
Figure 13:
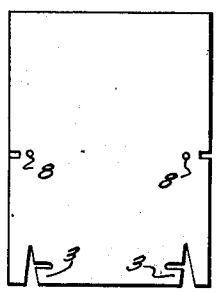
Figure 14:
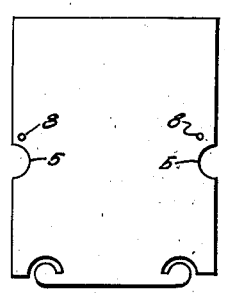
Figure 15:
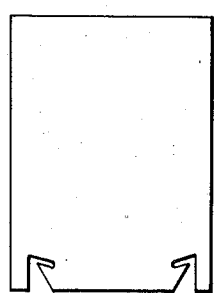
Figure 16:
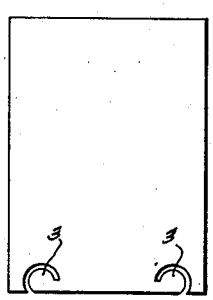
Figure 17:
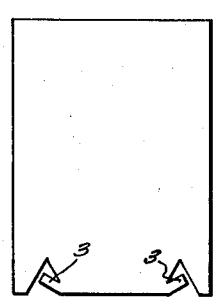

It will also be understood that the weather edge 1 shown as straight in Figure 1 may be either straight or curved as exhibited in some of the other figures, more particularly Figures 5, 7 and 8, which exhibit the straight edge and Figures 6 and 10 which exhibit the curved edge. The invention is not limited in this respect.

The several figures of the drawings thus far described furthermore deal with shingles of the diamond type which when laid on a roof appear more like shingles of the hexagonal type. However, the invention is not limited to these types of shingles, but may be used in square "individual" types.

Figure 19:
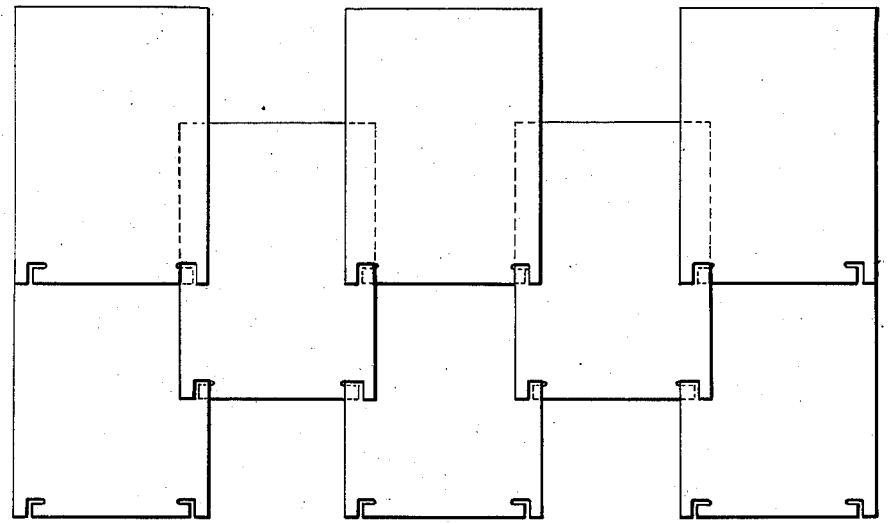
Figure 20:
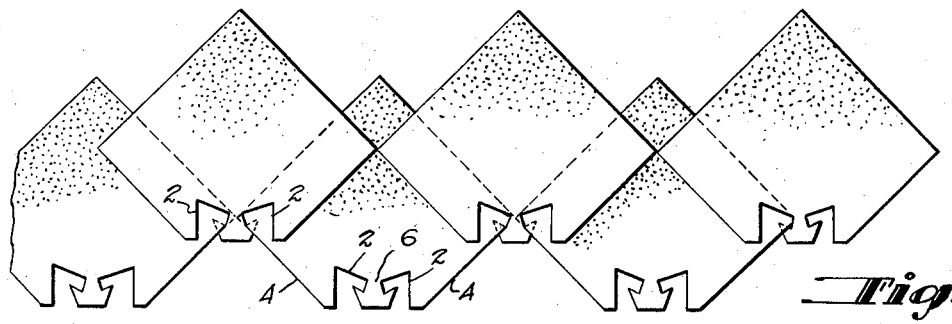
Figure 20 shows a number of shingles of the kind shown in Figure 5 laid in two courses with three shingles in the underlying course and three shingles in the overlying course.
Figure 21:
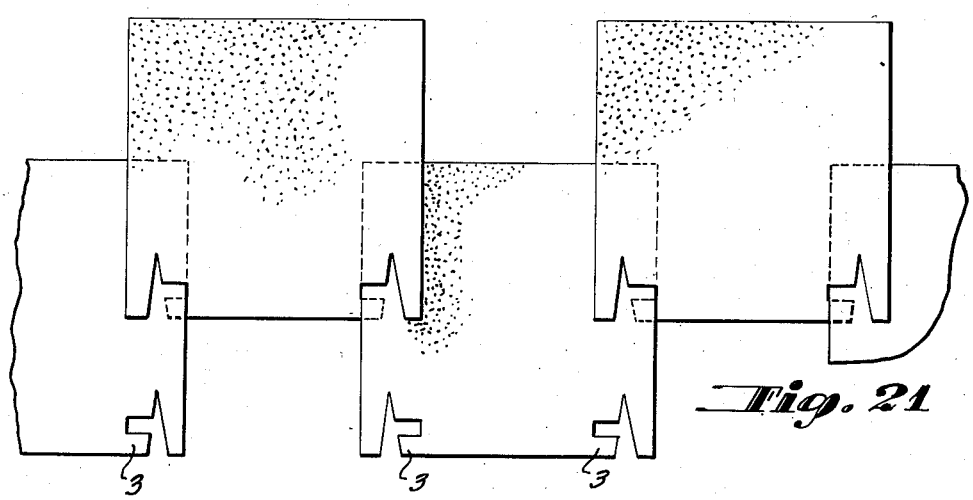
Figure 21 is a view similar to Figure 20, but illustrating shingles of the kind shown in Figure 13 laid in two courses.
Figure 22:
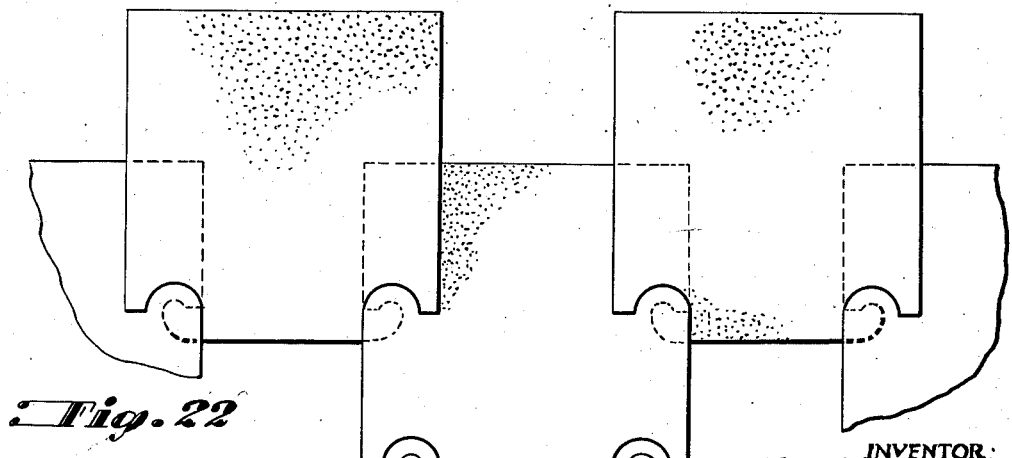
Figure 22 is a view similar to Figure 21, but illustrating the use of the shingle shown in Figure 14.

Figures 11–17 show this latter type of shingle. The wings may be formed as in any of the previous figures by cutting slots or cut outs 2, so as to extend inwardly from the weather edge 1 to form the oppositely projecting wings 3. Shingles of the kind shown in Figure 12, in detail, are shown assembled in Figure 19, which illustrates the interlocking relation serving to hold down the weather ends of the shingles. The interlocking relation may be increased or made stronger by providing the lateral edges of these shingle bodies with notches 5 of any appropriate shape. Figures 11 through 14 are illustrative in this connection. These notches when employed serve to accurately control the overlapping of shingles of successive courses and produce proper spacing. They also facilitate the positioning of the nails by which the shingles are held in place on a roof. If desired, the said notches may be used exclusively for this latter purpose in which case they do not need to be made quite as large as shown for example in Figure 11, but they may be mere indentations which the roofer will understand to be nail guides, the nails being driven through the shingles in proximity to the notches, as indicated at 8. Nevertheless in practice I preferably utilize these notches for the dual function of providing a stronger lock and at the same time serve as nail guides.

It will be noted from the foregoing detailed description that the shingle of this invention may be readily and economically manufactured from strip material without material waste and that in the various forms of the invention shown for illustrative purposes, the shingle may be applied by a roofer with accuracy and dispatch. When in place on a roof, the weather end of the shingle in every instance will be held down, so that it cannot warp or flap in the wind. In every instance, the shingle is provided within the confines of the body of the shingle with oppositely projecting wings adapted to extend under underlying shingles to form a firm permanent lock which cannot become inadvertently disengaged.

In all of the structures which I have described the locking wings are positioned inwardly of the body of the shingle from the lateral edges of the body and in each instance the body projects down laterally of the wings to the lower edges of the wings and this is advantageous for several reasons. For example, when the wings are introduced below the edges of underlying shingles, these wings have a tendency to lift the edges of the underlying shingles, but as the projecting portions of the shingle body overlie the wings and rest on top of the underlying shingles, they have a tendency to, and in practice do, hold down those edges of the underlying shingles and thus preclude them from bulging up to produce an unsightly appearance. At the same time by holding down the edges as described, they produce a tighter roof and preclude entrance of water under the edges of the said underlying shingles.

In the foregoing detailed description, I have referred to cut outs or slots. I have used these terms advisedly and with the intent that they be given a definite meaning and understanding. That is to say, a cut out as such, or a cut out which may form a slot having parallel or non-parallel sides contemplates, in every instance within the purview of this invention, an actual cutting away of the material of the body of the shingle, so that there is positively cut out and discarded a portion of the material from which the shingle is made leaving in the place thereof a distinct opening, the opposite edges of which are spaced apart an appreciable distance. Therefore, reference to cut outs or slots is not to be confused with "slits", which have no place in this invention and which are formed by mere cuts into the material which do not actually cut away and dispose of some part of the stock.

The present invention contemplates the use of cut outs or slots which extend from the outer edge of the shingle into the body of the shingle itself to form an open, unrestricted passage throughout its length. Such an open, unrestricted passage is not only different in structure from a mere slit, but it has a different function, namely, in permitting not only the unrestricted introduction of another shingle body thereinto, but it provides also that, after the parts are assembled, that portion of the shingle body which extends through or into the cut out or slot is free to shift edgewise therein, as is necessary in composition roofing due to the expansion and contraction of the material under changes in temperature. A slit will produce a binding action which defeats the very purpose of this invention, and a slit furthermore serves to produce an undesirable deformity of the shingle when cooperating with another shingle of the same kind. The use of slots and cut outs forming unrestricted passage throughout their length not only constitutes different structure from a slit shingle, but shingles, having cut outs and slots in the sense described, operate in a different way and produce a superior result.

In the foregoing description and in the accompanying drawings, many illustrative forms of the invention are advanced, but the invention is to be understood as fully commensurate with the appended claims.

Having thus fully described the invention, what I claim as new and desire to secure by Letters Patent is:

1. A shingle comprising a body having side edges and a transverse bottom edge and provided with openings of ununiform width extending into the body of the shingle from the transverse bottom edge adjacent to but spaced from the side edges of the shingle and toward one another to form oppositely extending retaining wings within the body of the shingle with the wings shaped to respectively extend beneath the contiguous side edges of two laterally adjacent shingles of the same kind in an underlying course, each of said openings being of its greatest width at said transverse bottom edge to provide an open, unrestricted, relatively wide passage extending into the shingle from the transverse bottom edge thereof to afford free access for the edge portion of another shingle.

2. A shingle comprising a body, the lower portion of which is in the form of a truncated triangle having downwardly converging side edges and a transverse bottom edge provided with openings of ununiform width extending into the body of the shingle from the transverse bottom edge adjacent to but spaced from the side edges of the shingle and toward one another to form oppositely extending retaining wings within the body of the shingle with the wings shaped to respectively extend beneath the contiguous downwardly converging side edges of two laterally adjacent shingles of the same kind in an underlying course, each of said openings being of its greatest width at said transverse bottom edge to provide an open, unrestricted, relatively wide passage extending into the shingle from the transverse bottom edge thereof to afford free access for the edge portion of another shingle.

3. A shingle comprising a body portion having downwardly converging side edges and a transverse bottom edge curved on an arc substantially tangent with the side edges, said transverse bottom edge being provided with openings of ununiform width extending into the body of the shingle from the transverse bottom edge adjacent to but spaced from the side edges of the shingle and toward one another to form oppositely extending retaining wings within the body of the shingle with the wings shaped to respectively extend beneath the contiguous downwardly converging side edges of two laterally adjacent shingles of the same kind in an underlying course, each of said openings being of its greatest width at said transverse bottom edge to provide an open, unrestricted, relatively wide passage extending into the shingle from the transverse bottom edge thereof to afford free access for the edge portion of another shingle.

4. A shingle comprising a body having side edges and a transverse bottom edge and provided with openings extending into the body of the shingle from the transverse bottom edge, adjacent to but spaced from the side edges of the shingle, and toward one another to form oppositely extending retaining wings within the body of the shingle with the wings shaped to respectively extend beneath the contiguous side edges of two laterally adjacent shingles of the same kind in an underlying course, those portions of the body of the shingle between each opening and the corresponding side edge being cut away for a distance from the bottom transverse edge of the portion of the shingle between the openings, to cause the retaining wings to extend below and above those portions of the shingle between the wings and the side edges of the shingle body.

5. A shingle comprising a body having side edges and a transverse bottom edge and provided with openings extending into the body of the shingle from the transverse bottom edge and from the intermediate portions of the length of which openings branch openings extend toward one another to form oppositely extending retaining wings within the body of the shingle.

6. A shingle comprising a substantially diamond shaped body, the weather point of which is cut off to provide a transverse bottom edge, said shingle body being provided with openings of ununiform width extending into the body of the shingle from the transverse bottom edge adjacent to but spaced from the side edges of the shingle and toward one another to form oppositely extending retaining wings within the body of the shingle with the wings shaped to respectively extend beneath the contiguous downwardly converging side edges of two laterally adjacent shingles of the same kind in an underlying course, each of said openings being of its greatest width at said transverse bottom edge to provide an open, unrestricted, relatively wide passage extending into the shingle from the transverse bottom edge thereof to afford free access for the edge portion of another shingle.

7. A shingle comprising a body having side edges and a transverse bottom edge and provided with openings extending into the body of the shingle from the transverse bottom edge only and between which, wings extend away from one another to form oppositely extending retaining wings within the body of the shingle.

HARRY H. HONIGBAUM.